United States Patent [19]

Okamoto

[11] 4,135,424
[45] Jan. 23, 1979

[54] VARIABLE FUNCTION GENERATOR

[75] Inventor: Shimaji Okamoto, Hamamatsu, Japan

[73] Assignee: Nippon Gakki Seizo Kabushiki Kaisha, Hamamatsu, Japan

[21] Appl. No.: 769,303

[22] Filed: Feb. 16, 1977

[30] Foreign Application Priority Data

Feb. 25, 1976 [JP] Japan ................................ 51-19743

[51] Int. Cl.² ............................................. G10H 1/02
[52] U.S. Cl. ..................................... 84/1.13; 84/1.03; 84/1.26; 84/DIG. 23
[58] Field of Search ............... 84/DIG. 23, 1.26, 1.13, 84/1.03

[56] References Cited

U.S. PATENT DOCUMENTS

| | | | |
|---|---|---|---|
| 3,992,971 | 11/1976 | Chibana | 84/1.03 |
| 3,999,456 | 12/1976 | Tsunoo | 84/1.03 |
| 4,026,179 | 5/1977 | Futamase | 84/1.26 |

*Primary Examiner*—Robert K. Schaefer
*Assistant Examiner*—Leonard W. Pojunas, Jr.
*Attorney, Agent, or Firm*—Cushman, Darby & Cushman

[57] ABSTRACT

A fully digitalized function-of-time generator suitable for use as a tone envelope generator in a digital electronic musical instrument, comprising: a clock pulse generator for generating a clock pulse at a selectable rate; a gate enabled at each arrival of the clock pulse; a single-stage binary shift register for successively shifting out its contents as a digital word representing the instantaneous values of a desired function of time synchronously with the clock pulse; a digital subtractor; a digital multiplier; and a digital adder, all of these members being interconnected to each other to be operative so that the output of the register is subtracted from a first set value representing a digital word, the resulting difference being multiplied by a second set value representing a digital word, the resulting product being added to the output of the register via the gate, so that the resulting sum is loaded into the register. Thus, the contents of the register approaches progressively toward the first set value, and finally becomes in agreement therewith. Thus, this musical instrument can produce a musical tone rich in expression and imparted with desired tone envelope characteristic, by appropriate choice of one or more of the first and the second values and the rate of the clock pulse.

11 Claims, 11 Drawing Figures

VARIABLE FUNCTION GENERATOR

BACKGROUND OF THE INVENTION (a) Field of the Invention

The present invention is concerned with a digital function-of-time generator for digitally generating a function of time, and more particularly, it relates to a digital function-of-time generator which is quite suitable for use in imparting to a musical wave an envelope characteristic, such as attack and decay, in a digital electronic musical instrument.

(b) Description of the Prior Art

In electronic musical instruments in general such as electronic organs, arrangement is provided so as to impart the generated musical tones with transient effects such as attack and decay, i.e. the so-called tone envelope characteristic, by multiplying a musical tone waveshape having a constant amplitude which is generated from the tone generator section, by a function of time.

An example of such function generator designed to generate a function-of-time signal is shown in a Japanese periodical NIKKEI ELECTRONICS June 16, 1975, pages 84-107, entitled DIGITAL ELECTRONIC ORGAN. This known function generator, however, deals with an analog structure and cannot be termed as being an optimum arrangement for use as the component of a digitalized electronic musical instrument.

Also, an example of a function-of-time generator having a semi-digital structure is proposed in the specification of U.S. Pat. No. 3,819,844 to Sigeki ISII issued on June 25, 1974 under the title "ELECTRONIC MUSICAL INSTRUMENT KEYING SYSTEM WITH ENVELOPE SAMPLE MEMORIZING VOLTAGE DIVIDERS". This function generator stated in said U.S. application includes an envelope memory which stores a specific information (sample values) constituting a function (wave shape). This function-of-time generator is arranged to have a simplified structure to be operative so that this envelope memory is scanned to read out the stored function of time. However, the function-of-time generator itself is not digitalized fully. In addition, the time function which this function-of-time generator can generate is limited to those time functions which have been already stored in the envelope memory.

SUMMARY OF THE INVENTION

It is, therefore, an object of the present invention to provide a digital function-of-time generator which is fully digitalized.

Another object of the present invention is to provide a digital function-of-time generator of the type described above, which is such that the function of time which is generated is freely selectable by a simple proper choice of some set values.

A basal example of the digital function-of-time generator according to the present invention comprises a gate which is enabled at each arrival of a clock pulse of a selectable rate; a register whose contents are delivered, in synchronism with the clock pulse, as the successive digital words representative of the instantaneous values of the aimed function of time; a digital subtractor; a digital multiplier; and a digital adder, interconnected so that the output of the register is subtracted in the subtractor from a first set value represented as a digital word; the resulting difference being multiplied at the multiplier by a second set value represented as a digital word, the resulting product being transferred via the gate to the adder to be added to the output of the register, and the resulting sum is loaded into the register. It is possible to generate a required function of time with the fully digitalized function-of-time generator of the present invention by an appropriate choice of one or more of the first and second values and the rate of the clock pulse.

As stated above, the digital function-of-time generator according to the present invention is fully digitalized in its entire arrangement, so that it is most suitable for being used in a digital electronic musical instrument.

Accordingly, still another object of the present invention is to provide a digital electronic musical instrument of the type described above, which can produce a musical tone which is rich in expression and which is imparted with an envelope characteristic such as attack and decay.

These and other objects as well as the features and the advantages of the present invention will become apparent by reading the following detailed description of the preferred embodiments when taken in conjunction with the accompanying drawings.

BRIEF DESCRIPTION OF THE DRAWINGS

Throughout the drawings, like parts are indicated by like reference numerals and symbols.

DETAILED DESCRIPTION OF THE PREFERRED EMBODIMENTS

Figure 1:
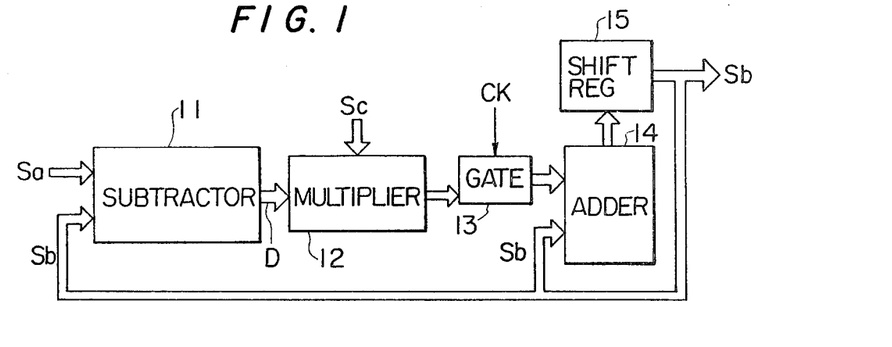
FIG. 1 is a simplified block diagram showing a basal example of a digital function-of-time generator according to the present invention, which is suitable for use in a digital electronic musical instrument.

In FIG. 1 is illustrated a basal example of a digital function-of-time generator according to the present invention which comprises: a digital subtractor 11; a digital multiplier 12; a gate 13; a digital adder 14; and a single-stage binary shift register 15. These components are indicated herein simply by blocks, because all of these structures may be of a conventional form. The register 15 successively shifts out its contents as the digital words $S_b$ representative of the instantaneous values of a desired function of time in synchronism with a clock pulse CK whose source is not shown. The output $S_b$ is also applied to the subtractor 11 and to the adder 14 as their respective inputs. The subtractor 11 implements the subtraction of the applied output $S_b$ from a first set value $S_a$ whose source is not shown which is applied in the form of digital word to this subtractor 11, and the resulting difference D is inputted to the multiplier 12 so that this difference D is multiplied by a second set value $S_c$ whose source is not shown, which value $S_c$ is applied in the form a digital word to the multiplier 12. The resulting product D x $S_c$ is transferred, via the gate 13 which is adapted to be enabled at each arrival of the clock pulse CK, into the adder 14, whereat the product is added to the applied output $S_b$. The resulting sum (D × $S_c$ + $S_b$) is loaded into the register 15 in synchronism with the clock pulse CK.

The operation of the digital function-of-time generator shown in FIG. 1 will hereunder be explained with reference to FIGS. 2A and 2B.

Figure 2A:
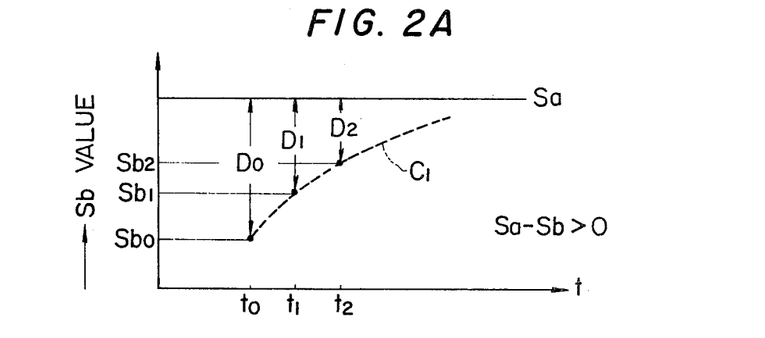
FIGS. 2A and 2B are explanatory charts for explaining the behavior of the digital function-of-time generator shown in FIG. 1, respectively.

Let us now consider, by referring to FIG. 2A, the variation with time of the contents $S_b$ of the register 15 in the instance wherein the first set value $S_a$ is set so as to be greater than the value of the content $S_{b0}$ existing at time $t_0$ in the register 15. In this instance, the initial difference $D_0$ is multiplied, at the multiplier 12, by the second set value $S_c$ which is less than one (1). The resulting product $D_0 \times S_c$ which is smaller than the initial difference $D_0$ is applied to the adder 14 at time $t_1$ at which time the first clock pulse CK arrives, and the resulting product which is applied to the adder 14 is added to the contents $S_{b0}$. The resulting sum ($D_0 \times S_c$ + $S_{b0}$) is loaded to the register 15. The difference $D_1$ between the first set value $S_a$ and the content $S_{b1} = D_0 \times S_c + S_{b0}$ loaded now in the register 15 is then multiplied by the second set value $S_c$. The resulting product $D_1 \times S_c$ is then added to the content $S_{b1}$ at time $t_2$ at which time the next clock pulse CK arrives. The resulting sum $D_2 = D_1 \times S_c + S_{b1}$ is then loaded to the register 15. As stated above, the value of the content $S_b$ of the register 15 will progressively approach toward the first set value $S_a$ along the broken line curve $C_1$ shown in FIG. 2A at each arrival of the clock pulse CK. Ultimately, the value of the content $S_b$ in the register 15 will become in agreement with the first set value $S_a$. In this state, the difference D is nil. It should be understood here that the broken line curve $C_1$ indicates a function of time which is generated in digital representation by the digital function-of-time generator shown in FIG. 1. Strictly speaking, the shape of the function is time-slottedly stepwise, but for the sake of convenience the shape is shown as a gradually changing continuous curve herein.

The operation in the instance wherein the first set value $S_a$ is set so as to be smaller than the value of the content $S_{b0}$ existing at time $t_0$ in the register 15 need only to be considered similar to that stated previously. In such an instance, there is obtained a function of time which is shown by the broken line curve $C_2$ shown in FIG. 2B.

Figure 2B:
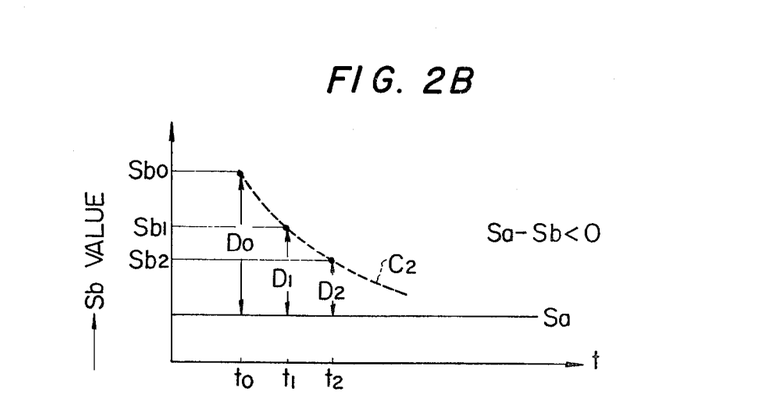

The broken line curves $C_1$ and $C_2$ shown in FIGS. 2A and 2B, i.e. the forms of the generated functions of time, are dependent upon the first set value $S_a$, the second set values $S_c$ and the rate of the clock pulse CK, respectively. More particularly, by setting the rate of the clock pulse CK so as to be quicker, and by setting the first set value $S_a$ so that the difference $D = S_a - S_b$ will take a larger value, and by setting the second set value $S_c$ so as to be substantially smaller than one (1), the broken line curves $C_1$ and $C_2$ will become steep.

As such, with the digital function-of-time generator of the present invention, it is possible to generate a required function of time simply by properly choosing the first and second set values $S_a$ and $S_c$ and the rate of the clock pulse CK.

A concrete example of the digital function-of-time generator of the present invention intended for use as the envelope shape generating means in a digital electronic musical instrument will hereunder be explained in detail by referring to FIGS. 3 through 7.

Figure 3:
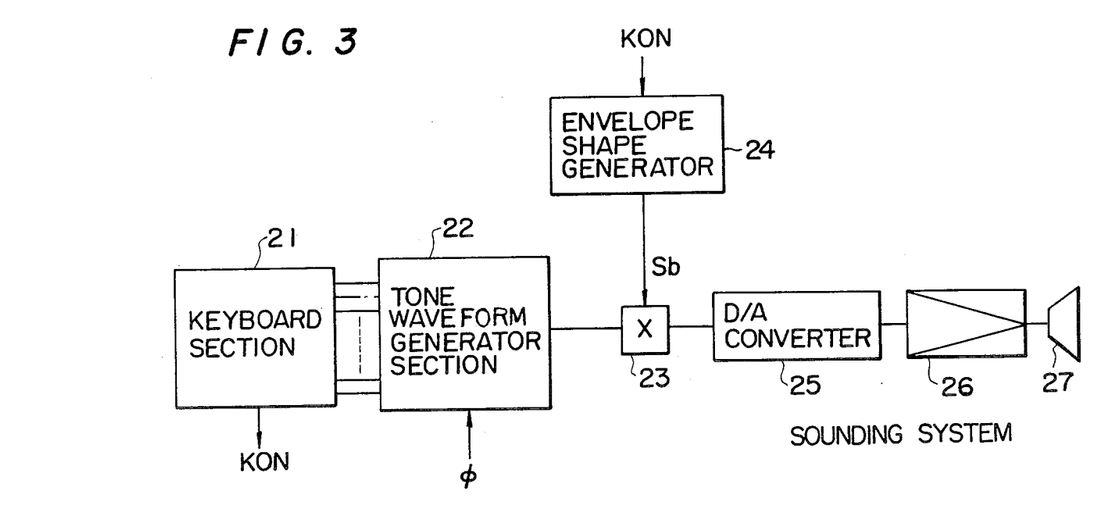
FIG. 3 is a simplified block diagram showing an example of a digital electronic musical instrument embodying the present invention.

In FIG. 3 is shown a digital electronic musical instrument embodying the present invention, which comprises: a keyboard section 21; a tone waveshape generator section 22; a digital multiplier 23; an envelope shape generator 24 which embodies the present invention; and a sounding system including a digital-to-analog (D/A) converter 25, an amplifier 26 and a loud speaker 27. The tone waveshape generator section 22 is adapted to successively generate digital words representative of sample values constituting a tone waveshape selected by the keyboard section 21. The tone waveshape generator section 22 is illustrated herein simply by block, because its structure may be of a conventional form. For instance, the tone waveshape generator section 22 may have such an arrangement as that shown in U.S. Pat. No. 3,809,786 entitled COMPUTOR ORGAN in which a tone waveshape is digitally produced by implementing, in synchronism with a timing pulse $\phi$, a discrete Fourier algorithm.

The tone waveshape which is generated from the tone waveshape generator section 22, the amplitude of which remains constant relative to time, is multiplied at a digital multiplier 23 by an envelope waveshape $S_b$ which is generated from an envelope shape generator 24, so that the tone waveshape which is provided with the envelope characteristics such as the attack, decay and so forth is obtained at the output of the digital multiplier 23. The digital words outputted from the digital multiplier 23 are then converted to analog voltages by the D/A converter 25, and these analog voltages are amplified at the amplifier 56 to drive the speaker 27.

Figure 4A:
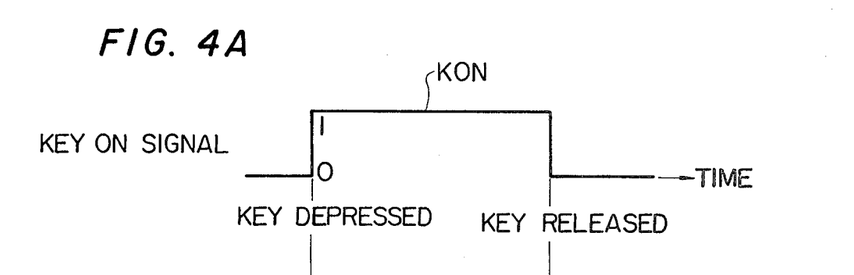
FIGS. 4A, 4B and 4C are explanatory charts for explaining the key-on signal, the function of time (voltage wave shape) and the envelope-imparted tone signal, which are respectively generated from the keyboard section, the digital function-of-gime generator (envelope shape generator) and the amplifier, all of which are included in the digital electronic musical instrument shown in FIG. 3.
Figure 4B:
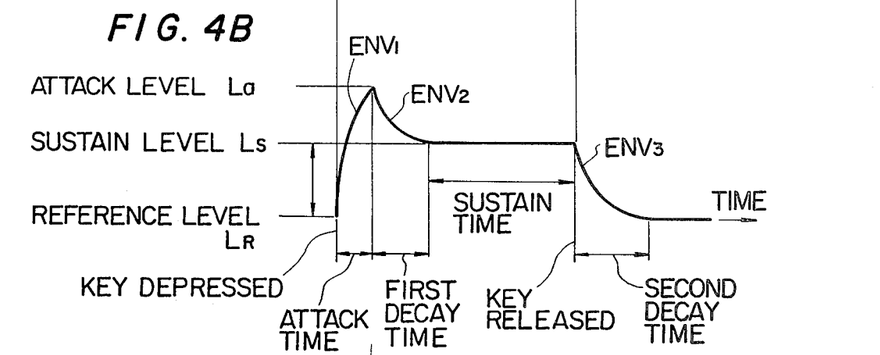
Figure 4C:
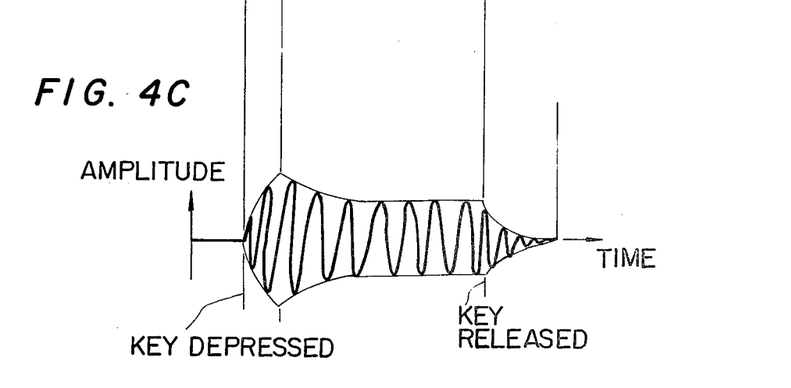

The operation of the whole system will be explained hereunder more concretely by referring to FIGS. 4A, 4B and 4C. During the period of time that a certain key of the keyboard not shown is depressed, there is delivered from the keyboard section 21 a key-on signal KON as that shown in FIG. 4A. Upon generation of this key-on signal KON, the envelope generator 24 will generate an envelope waveshape $S_b$ in digital word representations defining a waveshape as shown in FIG. 4B, to be applied to the digital multiplier 23. Thus, as shown in FIG. 4C, there is obtained, at the output of the amplifier 26, an analog tone waveshape having an envelope corresponding to the envelope waveshape $S_b$.

Figure 5:
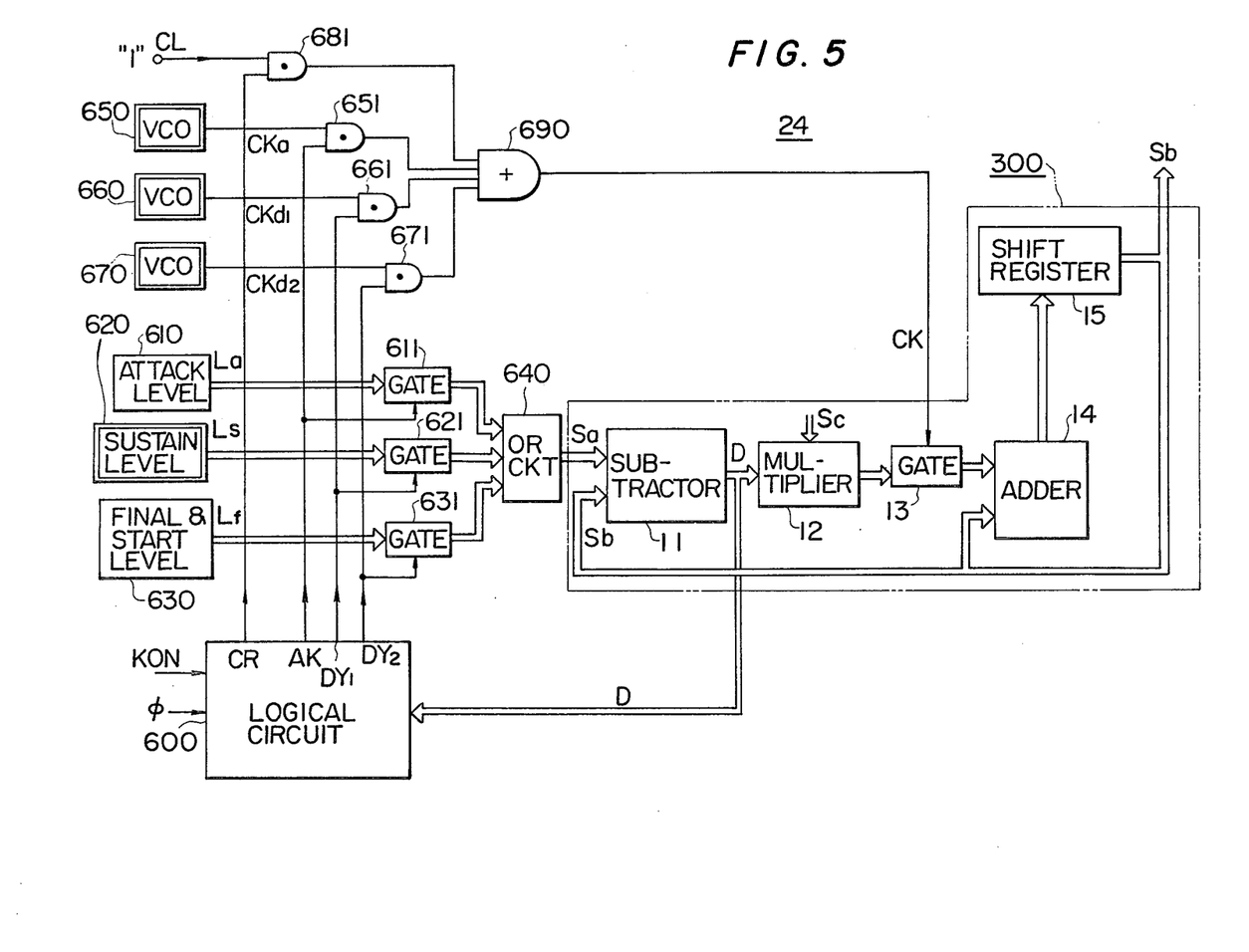
FIG. 5 is a block diagram showing a general arrangement example of the digital function-of-time generator included in the digital electronic musical instrument shown in FIG. 3.

FIG. 5 shows a concrete example of the envelope shape generator 24 shown in FIG. 3, which includes: a function calculating section 300 having the same arrangement as that of the basal embodiment of the present invention illustrated in FIG. 1; a clock pulse generating section comprising pulse generators 650, 660 and 670, AND gates 651, 661 and 671, and an OR gate 690; a level setting section comprising level setters 610, 620 and 630, gate circuits 611, 621 and 631, and an OR circuit (bit-by-bit OR logic) 640; and a control section including logic circuit 600 and an AND gate 681.

The level setters 610, 620 and 630 are provided to generate digital words representative of the attack level $L_a$, the sustain level $L_s$ and the reference (zero) level $L_f$ (see FIG. 4B), respectively. These setters may be comprised of, for example, read-only memory or the like, respectively. Also, the sustain lever setter 620 may be constituted of a plurality of read-only memories or the like, respectively. Also, the sustain level setter 620 may be constituted of a plurality of read-only memories containing different storages, to be operative so as to read out the storage of a single read-only memory selected from these plural number of read-only memories by a manual switching operation of the switching means which is provided on, for example, the operating panel of an electronic musical instrument, to thereby insure that the player of the instrument can alter the sustain level $L_s$ at will. It will be needless to say, however, that the aforesaid level setters 610, 620 and 630 may have any other arrangement than that mentioned above.

The outputs of the level setters 610, 620 and 630 will be selectively applied, as the first set value $S_a$, to the subtractor 11 of the function calculating section 300 via the gate circuits 611, 621 and 631 and the OR circuit 640.

Those pulses $CK_a$, $CK_{d1}$ and $CK_{d2}$ which are generated by the pulse generators 650, 660 and 670 are applied, as the clock pulse CK, to the gate 13 of the function calculating section 300, respectively, during the respective periods of time, i.e. the attack time, the first decay time and the second decay time (see FIG. 4B). Arrangement may be provided so that these pulse generators 650, 660 and 670 are to serve as the voltage-controlled oscillators and that the oscillation frequencies of these respective voltage-controlled oscillators, i.e. the frequencies of the generated pulses $CK_a$, $CK_{d1}$ and $CK_{d2}$, can be varied by the operation of, for example, manual levers which are provided on the operating panel of the electronic musical instrument.

Description will hereunder be made on the operation of the envelope shape generator 24 shown in FIG. 5.

When a key is depressed, the keyboard section 21 shown in FIG. 3 will generate the key-on signal KON. The logic circuit 600, immediately after the arrival of the key-on signal KON, will deliver an attack command signal AK to the AND gate 651 and to the gate circuit 611, thereby enabling them. Whereupon, the pulse $CK_a$ which is generated by the pulse generator 650 is applied, as the clock pulse CK, to the gate 13 in the function calculating section 300 via the enabled AND gate 651 and the OR gate 690, and along therewith the output $L_a$ of the attack level setter 610 is applied, as the first set value $S_a$, to the subtractor 11 provided in the function calculating section 300, via the enabled gate circuit 611 and the OR circuit 640. Subsequently, at each arrival of the clock pulse $CK_a$, the value of the output $S_b$ of the register 15 undergoes a progressive augmentation toward the first set value $S_a$, i.e. the attack level $L_a$. As a result, there is obtained the attack envelope $ENV_1$ as shown in FIG. 4B.

When the value of the output $S_b$ of the register 15 has increased up to the attack level $L_a$, and when thus the output D of the subtractor 11 becomes zero, the logic circuit 600 will cease the generation of the attack command signal AK, and at the same time therewith the logic circuit 600 will deliver the first decay command signal $DY_1$ to the AND gate 661 and to the gate circuit 621. Accordingly, the pulse $CK_{d1}$ which is generated by the pulse generator 660 is applied, as the clock pulse CK, to the gate 13 via the enabled AND gate 661 and via the OR gate 690. Along therewith, the sustain level $L_s$ which is derived from the sustain level setter 620 is applied, as the first set value $S_a$, to the subtractor 11 via the enabled gate circuit 621 and via the OR circuit 640. Thus, upon each arrival of the clock pulse $CK_{d1}$, the output $S_b$ progressively decreases in value toward the sustain level $L_s$. As a result, there is obtained the first decay envelope $ENV_2$ as shown in FIG. 4B. Continuously after the sustain time (see FIG. 4B), the output $S_b$ will be held continuously at the sustain level $L_s$ so long as the applied key-on signal KON is present, i.e. until the depressed key is released.

When the depressed key is released, the keyboard section 21 ceases the generation of the key-on signal KON. When, thus, the key-on signal KON ceases to arrive, the logic circuit 600 immediately stops the generation of the first decay command signal $DY_1$. At the same time therewith, this logic circuit 600 gives out the second decay command signal $DY_2$. Whereupon, both the AND gate 671 and the gate circuit 631 are enabled by said second decay command signal $DY_2$. Thus, the pulse $CK_{d2}$ which is delivered from the pulse generator 670 and the reference (zero) level $L_f$ which is delivered from the reference level setter 630 are both applied, as the clock pulse CK and the first set value $S_a$ respectively, to the function calculating section 300. In this way, at each arrival of the clock pulse $CK_{d2}$, the output $S_b$ of the register 15 will become progressively mitigated toward the reference level $L_f$, and as a result there is obtained the second decay envelope $ENV_3$ as shown in FIG. 4B. When the output $S_b$ has decreased up to the reference level $L_f$ and when thus the output D of the subtractor 11 has become zero, the logic circuit 600 ceases the generation of the second decay command signal $DY_2$, and it generates the clear command signal CR. This clear command signal CR enables the AND gate 681. Via the resulting enabled AND gate 681 and the OR gate 690, the clear signal of "1" level whose source is not shown is applied to the gate 13 provided in the function calculating section 300. As a result, the gate 13 is enabled. At this point of time, the gate circuits 611, 621 and 631 are all in the disabled state, and the first set value $S_a$ is zero (reference value). Therefore, the content $S_b$ of the register 15 is held zero.

Figure 6:
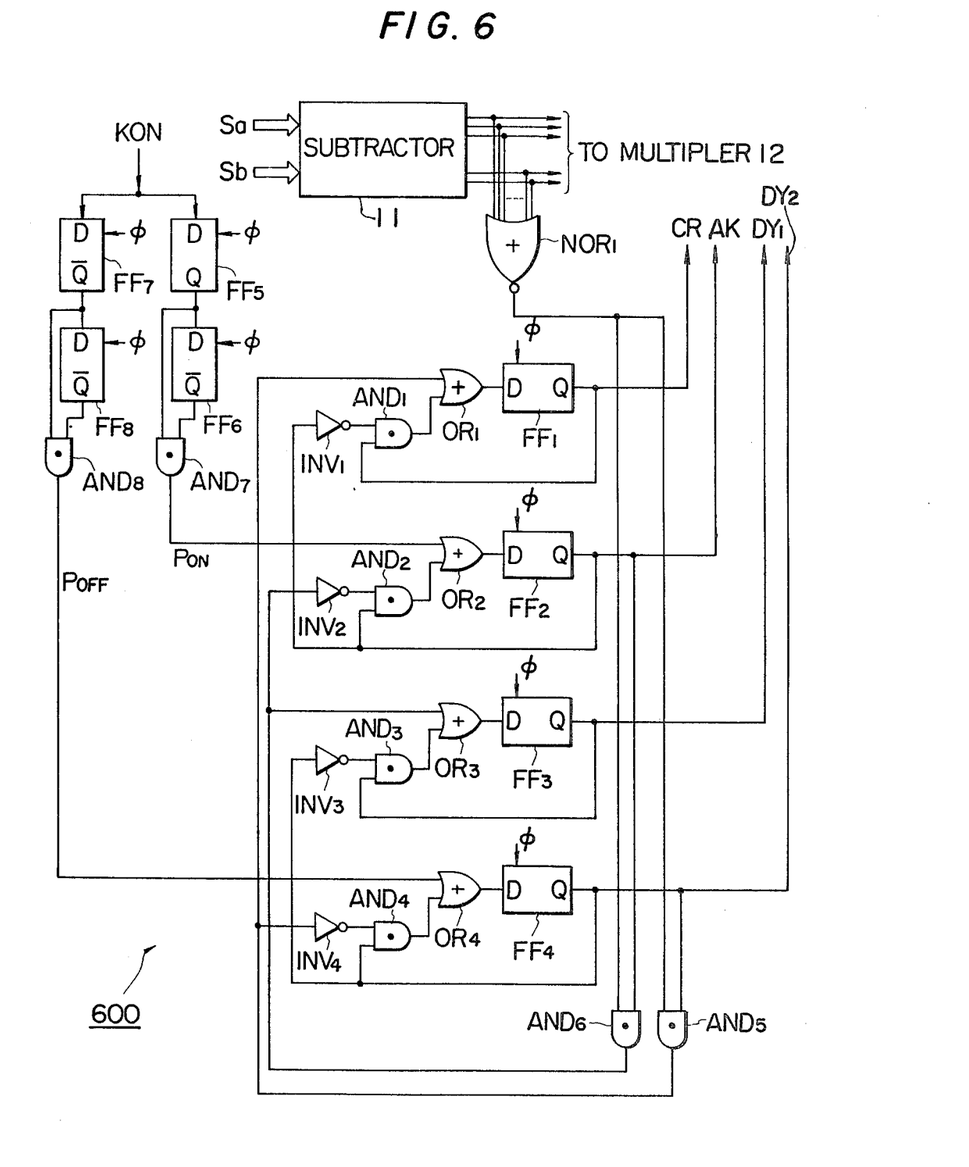
FIG. 6 is a block diagram showing an arrangement example of the controlling logic circuit included in the digital function-of-time generator shown in FIG. 5.

A concrete example of the logic circuit 600 shown in FIG. 5 is illustrated in FIG. 6. Hereunder will be described the arrangement and the behavior of this logic circuit 600 by referring to FIGS. 7 and 8.

In FIG. 6, symbols $FF_1$ - $FF_8$ represent flip-flops, respectively. Symbols $AND_1$ - $AND_8$ represent AND gates, respectively. Symbols $OR_1$ - $OR_4$ represent OR gates, respectively. Symbol $NOR_1$ represents an NOR gate. Symbols $INV_1$ - $INV_4$ represent inverters, respectively.

Figure 7:
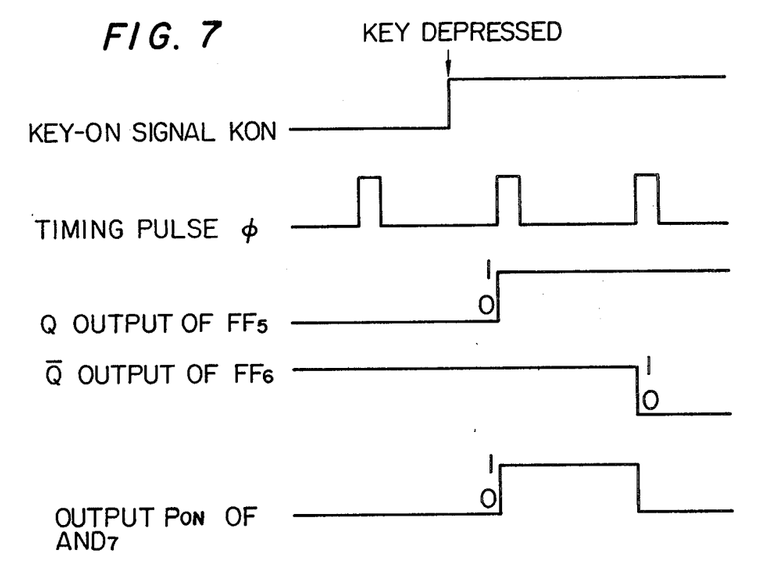
FIGS. 7 and 8 are timing charts of the controlling logic circuit shown in FIG. 6.

When a key is depressed, and when accordingly a key-on signal KON is given out from the keyboard section 21, the flip-flop $FF_5$ is set at the point of time when a timing pulse $\phi$ generated immediately after the key depression arrives. Whereupon, the $\overline{Q}$ output of this flip-flop $FF_5$ is rendered to "1" level. At the arrival of the next timing pulse $\phi$, the flip-flop $FF_6$ is set, and its $\overline{Q}$ output is rendered to "0" level. Accordingly, the AND gate $AND_7$ gives out a pulse $P_{ON}$ as shown in FIG. 7. By the timing pulse $\phi$ which arrives during the period of time in which this pulse $P_{ON}$ is applied to the flip-flop $FF_2$ via the OR gate $OR_1$, this flip-flop $FF_2$ is set, so that its $\overline{Q}$ output is rendered to "1" level.

Whereby, there is generated an attack command signal AK.

During the attack time (see FIG. 4B), the output D of the subtractor 11 is not zero, and accordingly the NOR gate $NOR_1$ will generate a "0" level output. Therefore, continuously after the pulse $P_{ON}$ has ceased to be present, the "1" level output of the AND gate $AND_2$ continues to be applied to the data terminal of the flip-flop $FF_2$, so that the flip-flop $FF_2$ is held continuously in its set state. More specifically, the attack command signal AK is continuously delivered throughout the period of the attack time (see FIG. 4B).

When, at the end of the attack time, the output D of the subtractor 11 becomes zero, the NOR gate $NOR_1$ gives out "1" level output. As a result, the output of the AND gate $AND_6$ becomes "1" level, causing the flip-flop $FF_2$ to reset, and accordingly the generation of the attack command signal AK ceases. At the same time therewith, the "1" level output of the AND gate $AND_6$ is applied to the flip-flop $FF_3$ via the OR gate $OR_3$, causing this flip-flop $FF_3$ to set, and its $\bar{Q}$ output is rendered to "1" level. Whereby, there is delivered the first decay command signal $DY_1$. During the period of the first decay time and the sustain time (see FIG. 4B), the flip-flop $FF_4$ remains in its reset state. Accordingly, the output of the inverter $INV_3$ is in the "1" level. Therefore, the output of the AND gate $AND_3$ remains in the "1" level throughout the first decay time and the sustain time. Thus, the flip-flop $FF_3$ is held in its set state, and the first decay command signal $DY_1$ is continuously given out.

Figure 8:
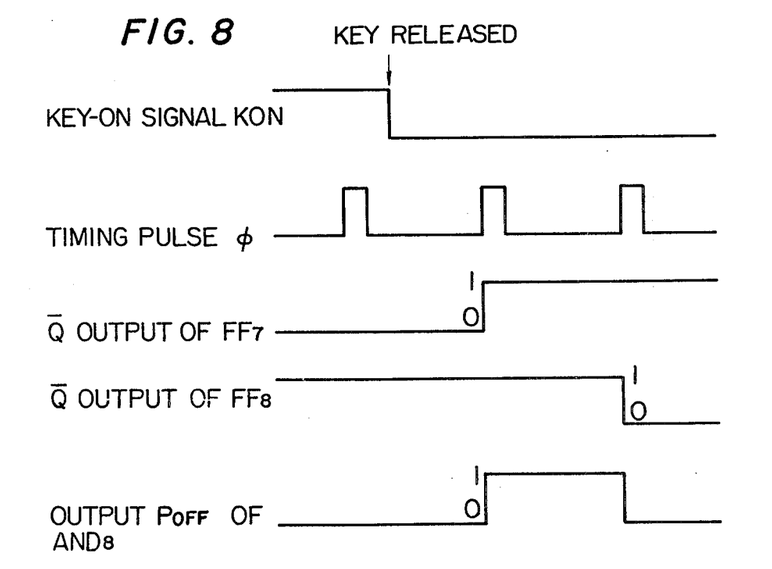

When the depressed key is released, the keyboard section 21 ceases the generation of the key-on signal KON as shown in FIG. 8. Accordingly, by the timing pulse $\phi$ which arrives immediately after this cease, the flip-flop $FF_7$ is reset, and its $\bar{Q}$ output is rendered to "1" level. Then, due to the next-arriving timing pulse $\phi$, the flip-flop $FF_8$ is reset, and its $\bar{Q}$ output is rendered to "1" level. Accordingly, the AND gate $AND_8$ gives out a pulse $P_{OFF}$ (see FIG. 8) as its output. This pulse $P_{OFF}$ is applied to the flip-flop $FF_4$ via the OR gate $OR_4$ so that the flip-flop $FF_4$ is caused to reset, and its $\bar{Q}$ output is rendered to "1" level. Whereby, the second decay command signal $DY_2$ is generated. At the same time therewith, the $\bar{Q}$ output of the flip-flop $FF_4$ is inputted to the inverter $INV_2$, so that the flip-flop $FF_3$ resets and the generation of the first decay command signal $DY_1$ ceases. The flip-flop $FF_4$ is latched to its set state by the actions of the AND gates $AND_4$ and $AND_5$, the OR gate $OR_4$ and the inverter $INV_4$. When the output D of the subtractor 11 becomes zero at the end of the second decay time (see FIG. 4B), the NOR gate $NOR_1$ gives out an output of "1" level. Therefore, the flip-flop $FF_4$ resets, and the generation of the second decay command signal $DY_2$ ceases. At the same time therewith, the "1" level output of the AND gate $AND_5$ is applied to the flip-flop $FF_1$ via the OR gate $OR_1$, causing this flip-flop $FF_1$ to be set, and the $\bar{Q}$ output of this flip-flop $FF_1$ is rendered to "1" level. Whereupon, the clear command signal CR is generated. At this point of time, the flip-flop $FF_2$ is in its reset state, and its $\bar{Q}$ output of "0" level is inputted to the inverter $INV_1$. Therefore, the flip-flop $FF_1$ is latched in its set state. When a fresh key-on signal KON arrives and when, accordingly, the flip-flop $FF_2$ is set, the flip-flop $FF_1$ is reset, and the generation of the clear command signal CR is caused to cease.

I claim:

1. A variable function generator, comprising, in combination:
    a first means having a first input terminal for receiving a first input signal,
    a second input terminal for receiving a second input signal,
    an output terminal for generating an output signal proportional to the difference of said first and second input signals from said output terminal,
    a second means for repeatedly transmitting the output signal of said first means at predetermined time intervals,
    a third means having a third input terminal connected to the output terminal of said first means through said second means,
    a fourth input terminal receiving said second input signal, and
    an output terminal for generating a sum signal of the output signal of said first means and said second input signal, the sum signal being used as a renewed second input signal.

2. A variable function generator according to claim 1, further comprising a fourth means for setting a voltage level of said first input signal and supplying a first input signal of an arbitrarily selected level to the first input terminal of said first means.

3. A variable function generator according to claim 2, wherein said fourth means changes the level of the first input signal upon reception of a trigger signal.

4. A variable function generator according to claim 1, further comprising a fifth means for generating a timing pulse train of a variable time interval and supplying it to said second means for determining said time interval.

5. A variable function generator according to claim 4, wherein said fifth means changes the timing of said timing pulse upon reception of a trigger signal.

6. A variable function generator according to claim 1, wherein said first means includes variable means for selecting the proportionality constant of the output signal to the difference of said first and second input signals.

7. A variable function generator according to claim 1, wherein said sum signal ($S_b$) changes according to the formula $$S_b = S_a - (S_a - S_{b0}) \exp(-ct/\tau)$$

where:
    $S_a$ is the first input signal level;
    $S_{b0}$ is the initial value of the second input signal level;
    c is a positive constant determining the proportionality constant $e^{-c}$;
    $\tau$ is the time interval; and
    t is time.

8. A variable function generator adapted for use in an electronic musical instrument comprising the combination of claim 1, and a keyboard, the depression in the keyboard initiating the operation of said combination.

9. A variable function generator adapted for use in an electronic musical instrument comprising the combination of claim 3, a keyboard, and a trigger signal generator means for generating said trigger signal upon key depression and key release in the keyboard and upon coincidence of said first and second input signals.

10. The variable function generator according to claim 9, wherein said combination includes a fifth means for generating a timing pulse train of a variable interval activated by said trigger signal and supplying the timing pulse to said second means.

11. A variable digital function generator adapted for use in an electronic musical instrument comprising:
- a variable digital level setting means for generating a first digital signal of a variable level, the level setting means capable of varying the signal level upon receipt of a trigger signal;
- a variable timing pulse generator for generating a timing pulse signal of a variable time interval, the timing pulse generator capable of varying the time interval upon receipt of a trigger signal;
- a digital subtractor means receiving said first digital signal and a second digital signal and generating a digital output signal representative of the difference of said two input signals;
- a digital multiplier means for multiplying a constant smaller than unity to the digital output signal of said subtractor means;
- a gate means for allowing the passage of the output signal of said multiplier means upon receipt of said timing pulse signal;
- an adder means for generating a digital sum signal of said second digital signal and the output signal of said multiplier means supplied through said gate means; and
- a register means for delivering said sum signal as said second digital signal, thereby the output of said register means generating a digital output signal varying from an initial value to said first digital signal level in an exponential manner.

* * * * *